No. 799,283. PATENTED SEPT. 12, 1905.
W. O. WALTON.
CULTIVATOR.
APPLICATION FILED JUNE 29, 1905.

2 SHEETS—SHEET 1.

WITNESSES:
F. C. Gibson.
John T. Schrott.

INVENTOR
Willis O. Walton.
BY
Fred G. Dieterich & Co.
ATTORNEYS.

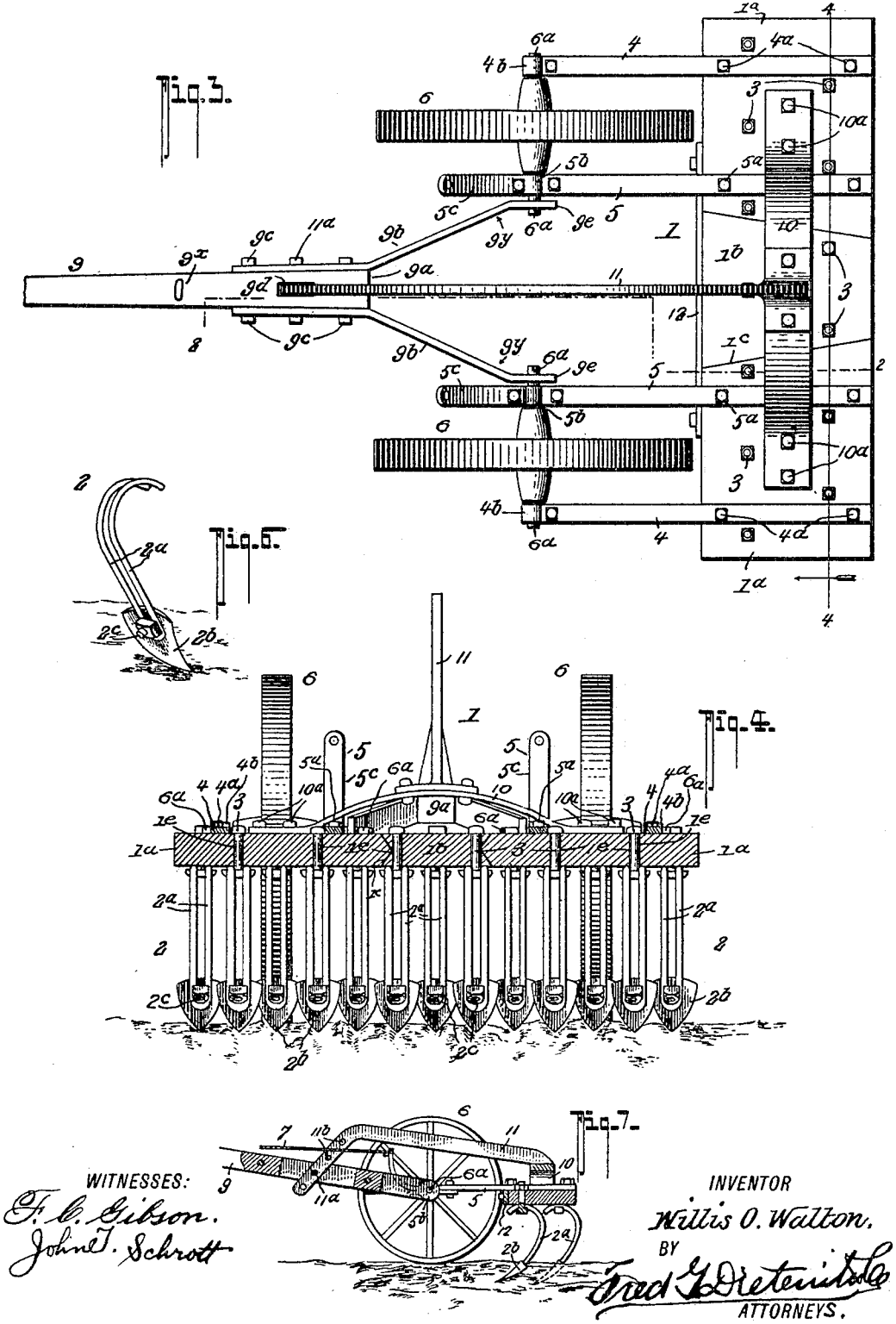

UNITED STATES PATENT OFFICE.

WILLIS O. WALTON, OF SEVENTEEN, OHIO.

CULTIVATOR.

No. 799,283. Specification of Letters Patent. Patented Sept. 12, 1905.

Application filed June 29, 1905. Serial No. 267,554.

*To all whom it may concern:*

Be it known that I, WILLIS O. WALTON, residing at Seventeen, in the county of Tuscarawas, in the State of Ohio, have invented a new and Improved Cultivator, of which the following is a specification.

My invention relates to certain new and useful improvements in cultivators, and it more particularly relates to hand-operated cultivators of the wheeled type.

Generically my invention comprises a body portion consisting of a plurality of sections secured together, to which sections a plurality of cultivator-teeth are detachably secured, the end sections carrying supporting-framework in which is mounted wheels on which the cultivator is adapted to run. Secured to the wheel-framework is a tongue which is adapted to be grasped by the operator, an adjusting-bar coöperating with the tongue and the body portion for adjusting the body portion with respect to the tongue, and means are connected with the wheel-frame and to the operator to assist in holding the teeth in the ground in their proper position and aid in the operation of the apparatus.

In its more detailed nature my invention comprises certain novel construction, combination, and arrangement of parts, all of which will be described first in detail and then be specifically pointed out in the appended claims, reference being had to the accompanying drawings, in which—

Figure 1:
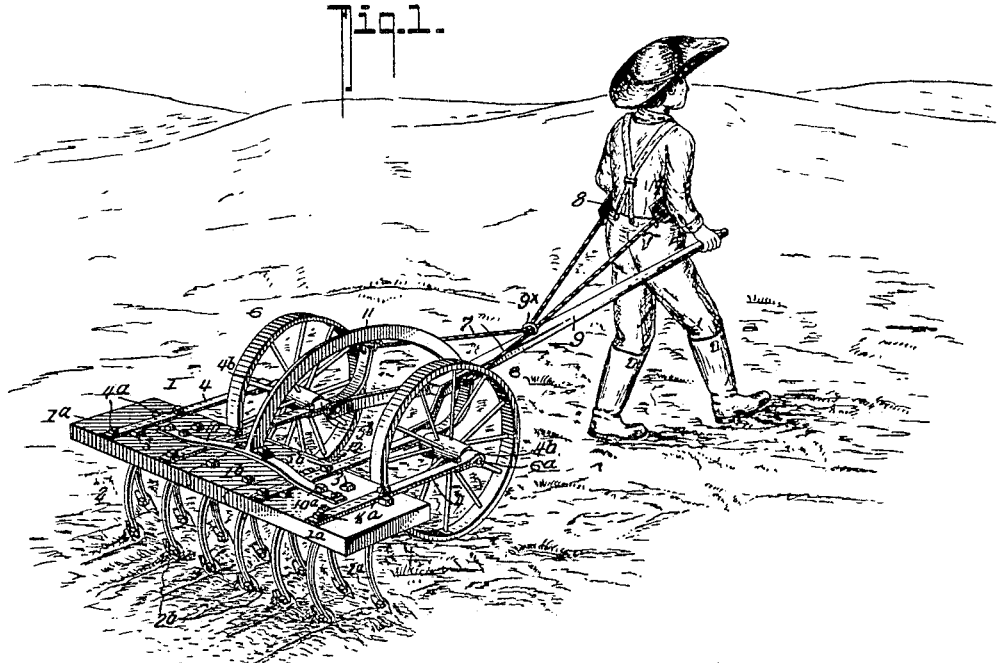
Figure 2:
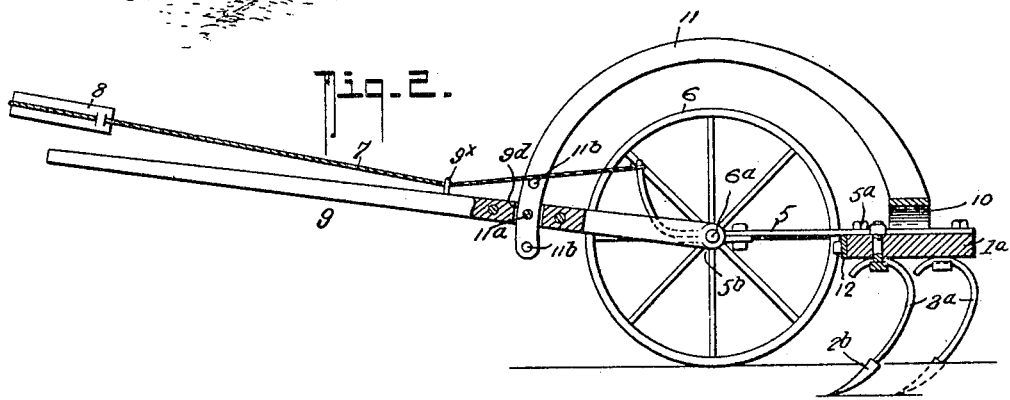
Figure 3:
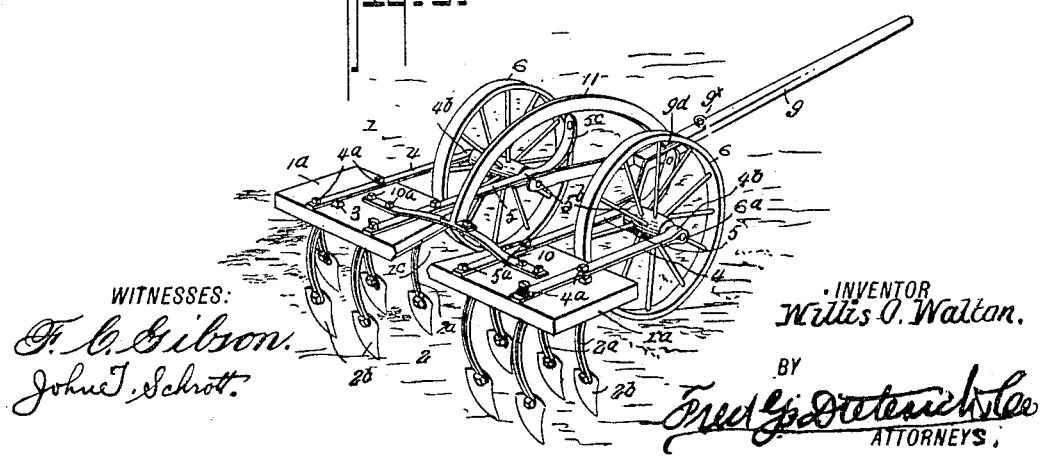

Figure 1 is a perspective view of my invention, showing the same applied for use. Fig. 2 is a vertical longitudinal section thereof, parts being broken away, the section being taken practically on the line 2 2 of Fig. 3. Fig. 3 is a top plan view of my invention. Fig. 4 is a cross-section on the line 4 4 of Fig. 3. Fig. 5 is a detail perspective view of the invention, showing the middle section removed. Fig. 6 is a detail perspective view of one of the cultivator-teeth detached. Fig. 7 is a detail sectional view of a slightly-modified form of my invention.

Referring now to the accompanying drawings, in which like numerals of reference indicate like parts in all of the figures, 1 designates the body portion, which comprises a beam formed in sections $1^a$ $1^a$ and $1^b$ of any desired size and shape, the central section $1^b$ being formed of wedge shape in plan view and having a tongue-and-groove connection $1^c$ with the end section $1^a$ $1^a$, as clearly shown in Fig. 1 of the drawings.

The body portion 1 is provided with a plurality of rows of cultivator-teeth 2, spaced a suitable distance apart, and the teeth 2 each comprise a wire standard $2^a$, bent into the shape desired and consisting of a pair of parallel strands, leaving a space between them and terminating in a U-shaped lower end to permit passage of the securing-bolts $2^c$, which fasten the blade $2^b$ adjustably to the standard $2^a$. The standard $2^a$ has its upper ends secured to the body portion 1 by bolts 3, which pass through the aperture $1^e$ in the body 1.

4 and 5 designate a pair of arms secured to the end sections $1^a$ $1^a$ and projecting forwardly therefrom and parallel to each other, as shown, and the arms 4 and 5 are secured to the sections $1^a$ $1^a$ by bolts $4^a$ $5^a$ and have bearings $4^b$ $5^b$ to receive the axles $6^a$ of the wheels 6, as shown. The arms 5 5 have upwardly-extending ends $5^c$ $5^c$, along which a cable or rope 7 is secured, and the cable or rope 7 passes through an eye $9^x$ on the tongue 9 and is secured to a body-plate 8, of leather or other suitable material. The tongue 9 has a pair of arms $9^b$ $9^b$ bolted to its inner end $9^a$ by bolts $9^c$, as shown, and the said arms $9^b$ $9^b$ diverge as at $9^y$ $9^y$ and terminate in parallel end portions $9^e$ $9^e$, which are apertured to fit over the projecting ends of the axle $6^a$, as shown.

10 designates a bridge member secured to the end sections $1^a$ $1^a$ of the body portion 1 by bolts $10^a$ $10^a$, if desired. Securely bolted or otherwise secured to the bridge member 10 is a curved brace member 11, whose free end passes into a slot $9^d$ in the tongue 9, to which tongue 9 it is adjustably secured by a bolt $11^a$ passing through the adjusting-apertures $11^b$ of the brace 11, as shown.

I provide a metallic strip or plate 12, which is secured to the end sections $1^a$ $1^a$ by wood-screws $12^a$ $12^a$ or otherwise, if desired, to hold the sections $1^a$ $1^a$ $1^b$ together in their proper correlative positions.

From the foregoing description it will be seen that I have provided a very simple and effective construction of cultivator which will readily and effectively serve its intended purposes, and in constructing the cultivator-teeth as shown and described the blades thereof can be readily adjusted up or down on the standard, as desired, to obtain the best results.

From the foregoing description, taken in connection with the accompanying drawings, it is thought the complete construction, operation, and many advantages of my invention will be readily understood by those skilled in the art to which it appertains, and I desire to say that the cultivator may be made in any size desired and that I do not limit myself to the exact details of construction herein described.

Having thus described my invention, what I claim, and desire to secure by Letters Patent, is—

1. A cultivator of the class described comprising a body formed in sections, means for securing said sections together, arms secured to said sections and extending forwardly of the machine, bearing portions on said arms, wheels having spindles mounted in said bearing portions between said arms, a tongue pivotally secured to said wheel-spindles, cultivator-teeth adjustably secured to said body, a curved brace-bar secured to said body portion and adjustably secured to said tongue, means secured to said arms for pulling the cultivator.

2. A cultivator comprising a body portion formed in sections, said sections having a tongue-and-groove connection with each other, a plurality of sets of cultivator-teeth adjustably secured to said body, a bridge member secured to said body, a plurality of pairs of arms secured to said body and projecting forwardly thereof, bearings on said arms, wheels having spindles mounted in said bearings, a tongue having a forked end pivotally secured to the spindles of said wheels, said tongue having a slot, a curved brace-bar rigidly secured to said bridge member with its free end passing through the slot in the tongue, means for adjustably securing the free end of the brace member to the tongue, all being arranged substantially as shown and described.

3. A cultivator comprising a body portion formed in sections, said sections having a tongue-and-groove connection with each other, a plurality of sets of cultivator-teeth adjustably secured to said body, a bridge member secured to said body, a plurality of pairs of arms secured to said body and projecting forwardly thereof, bearings on said arms, wheels having spindles mounted in said bearings, a tongue having a forked end pivotally secured to the spindles of said wheels, said tongue having a slot, a curved brace-bar rigidly secured to said bridge member with its free end passing through the slot of the tongue, means for adjustably securing the free end of the brace member to the tongue, one of each pair of said arms terminating in upwardly-extending portions, a cord or cable secured to said upwardly-extending portions, a body-engaging plate attached to said cable and adapted to pass around the body of the operator, substantially as shown and described.

4. A cultivator comprising a body portion formed in sections, said sections having a tongue-and-groove connection with each other, a plurality of sets of cultivator-teeth adjustably secured to said body, a bridge member secured to said body, a plurality of pairs of arms secured to said body and projecting forwardly thereof, bearings on said arms, wheels having spindles mounted in said bearings, a tongue having a forked end pivotally secured to the spindles of said wheels, said tongue having a slot, a curved brace-bar rigidly secured to said bridge with its free end passing through the slot in the tongue, means for adjustably securing the free end of the brace member to the tongue, said cultivator-teeth each comprising a standard consisting of parallel members spaced apart and terminating at their lower end in a U-shaped portion, a plate adjustably secured to said standards at their lower ends, substantially as shown and described.

5. A cultivator comprising a body portion formed in sections, said sections having a tongue-and-groove connection with each other, a plurality of sets of cultivator-teeth adjustably secured to said body, a bridge member secured to said body, a plurality of pairs of arms secured to said body and projecting forwardly thereof, bearings on said arms, wheels having spindles mounted in said bearings, a tongue having a forked end pivotally secured to the spindles of said wheels, said tongue having a slot, a curved brace-bar rigidly secured to said bridge member with its free end passing through the slot of the tongue, means for adjustably securing the free end of the brace member to the tongue, one of each pair of said arms terminating in upwardly-extending portions, a cord or cable secured to said upwardly-extending portions, a body-engaging plate attached to said cable and adapted to pass around the body of the operator, said cultivator-teeth each comprising a standard consisting of parallel members spaced apart and terminating at their lower end in a U-shaped portion, and a plate adjustably secured to said standards at their lower ends, substantially as shown and described.

6. A cultivator comprising a body consisting of a beam formed in three sections having a tongue and groove connected with each other, the middle section being wedge-shape in plan view, a pair of arms detachably secured to each end section and projecting forwardly thereof and parallel to each other, said arms having bearing portions, wheels having spindles mounted in said bearing portions, the inner ones of said arms being provided with upwardly-extending portions, a pull-rope secured to the said upwardly-extending portions, a bridge member secured to the end sections of the body, a curved brace-bar secured to said body member, a tongue pivotally secured to said wheel-spindles, said tongue having a slot to receive the free end of said curved brace member, means adjustably securing said brace-bar to said tongue, and a plurality of adjustable cultivator-teeth secured to said body all being arranged substantially as shown and described.

WILLIS O. WALTON.

Witnesses:
 RETTA GINTHER,
 L. S. MINSCH.